United States Patent [19]
Wafer

[11] 3,959,753
[45] May 25, 1976

[54] CIRCUIT INTERRUPTER WITH LOAD SIDE SHORT CIRCUIT

[75] Inventor: John A. Wafer, Monroeville, Pa.

[73] Assignee: Westinghouse Electric Corporation, Pittsburgh, Pa.

[22] Filed: Sept. 5, 1974

[21] Appl. No.: 503,231

Related U.S. Application Data

[63] Continuation of Ser. No. 436,588, Jan. 25, 1974.

[52] U.S. Cl. .................................. 335/16; 335/147
[51] Int. Cl.² ........................................ H01H 77/10
[58] Field of Search ................. 317/16, 11 C, 11 A, 317/11 B; 335/16, 147, 195

[56] References Cited
UNITED STATES PATENTS

| 2,925,548 | 2/1960 | Scherer | 317/16 |
| 3,118,102 | 1/1964 | Cable | 317/16 |
| 3,588,604 | 6/1971 | Hauspurg | 317/11 C |
| 3,813,619 | 5/1974 | Koval | 335/16 |
| 3,815,059 | 6/1974 | Spoelman | 335/16 |
| 3,824,508 | 7/1974 | Terracol | 335/16 |

Primary Examiner—Harold Broome
Attorney, Agent, or Firm—W. A. Elchik

[57] ABSTRACT

A circuit interrupter protective device characterized by a two-level current limiting structure which provides current limiting on the main or supply side of the current limiter to one level of the peak let through current and to a much lower level on the load side which is achieved by activating a short circuit in parallel with the load by closing a set of shunt contacts the instant the current limiter begins to operate while the current limiter remains in the supply circuit to continue opening the circuit and dissipating the energy of an arc in deion plates.

10 Claims, 8 Drawing Figures

CIRCUIT INTERRUPTER WITH LOAD SIDE SHORT CIRCUIT

This is a continuation, of application Ser. No. 436,588 filed Jan. 25, 1974.

CROSS REFERENCE TO RELATED APPLICATIONS

This invention is related to the invention disclosed in the applications of L. A. Spoelman, Ser. No. 331,007, filed Dec. 1, 1972, now U.S. Pat. No. 3,815,059 issued June 4, 1974; John A. Wafer, Ser. No. 437,586, filed Jan. 29, 1974; and Paul Slade and John Wafer, Ser. No. 390,283, filed Aug. 21, 1973.

BACKGROUND OF THE INVENTION

1. Field of the Invention

This invention relates to a circuit breaker of the current limiting type and, more particularly, it pertains to a two level current limiting circuit interrupter.

2. Description of the Prior Art

In most current limiting devices the load side of the current limiter has a lower energy withstand ($I^2t$) and peak let-through current capability than the main or supply side of the equipment. For example, the 400 ampere current limiter will limit a 170 KA fault to approximately 46 KA at 600 volts. The current limiter can absorb this level of peak let-through current and $I^2t$ several times. However, it is desirable to further reduce let-through current so that smaller breakers and equipment downstream can be protected. The overall problem has been to reduce the peak let through current and $I^2t$ to an acceptable level on the main or supply side and to reduce it to a much lower level on the low side of the circuit breaker.

SUMMARY OF THE INVENTION

It has been found in accordance with this invention that the foregoing problem may be overcome by providing a circuit interrupter protective device comprising a circuit interrupter structure including stationary contact means and cooperative movable contact means, a contact carrier carrying the movable contact means, means supporting the contact carrier for movement between closed and open positions, a magnetic drive structure comprising a magnetic device of magnetic material having an open slot therein open at one end and closed at the other end, the contact carrier being positioned in the slot in proximity to the open end, the support means including movable means for moving the contact carrier to the closed position, the circuit through the circuit interrupter passing through the contact carrier, the contact in the closed position of said contact carrier, a second pair of contacts cooperating with the contact carrier and in a shorting circuit parallel with the low side of an electrical distribution system and the second pair of contacts being movable between open and closed positions substantially simultaneously with the first and second pairs of contacts, and upon the occurrence of an overload current above a predetermined termed value through the contact carrier the magnetic flux generated by the current in the contact carrier operating in the magnetic device to drive the contact carrier into the slot towards the closed end of the slot to thereby open the contact and causing the second contact to close.

The advantage of the device of this invention is that current limitation is achieved on the load side of the current limiting device by short circuiting the main or supply line on the load side and leaving the current limiter in series with the shorted main or supply to continue opening the circuit and dissipate the energy in an arc and deion plates. This invention will greatly reduce peak let-through currents and $I^2t$ that is otherwise experienced by the load. It is further contemplated that the peak let-through current may be reduced to a level where semiconductor protection is feasible.

DESCRIPTION OF THE PREFERRED EMBODIMENTS

Figure 1:
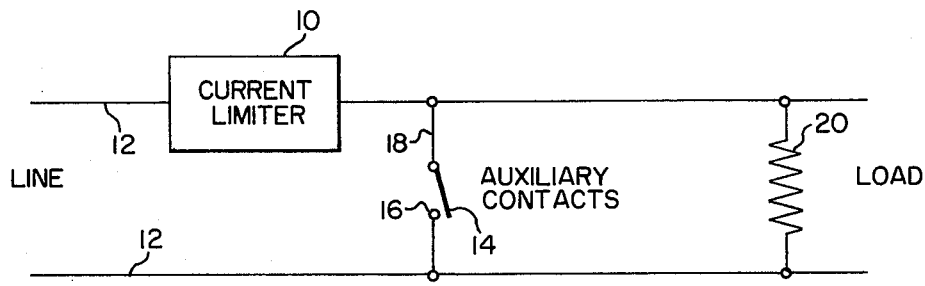
FIG. 1 is a schematic view of a current limiter in a circuit of a single phase system.
Figure 2:
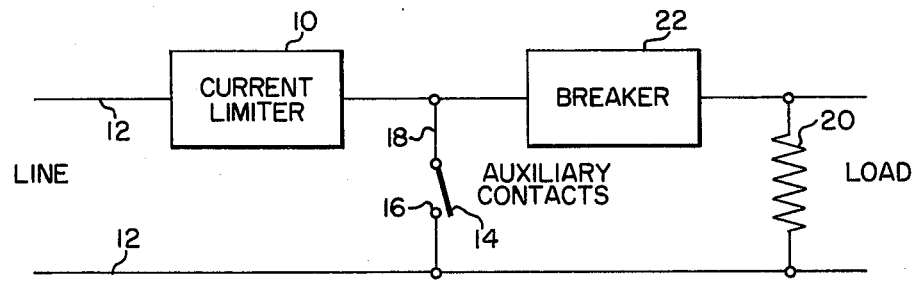
FIG. 2 is a schematic view similar to that of FIG. 1 with the addition of a circuit breaker in series with the current limiter.

In FIG. 1 a current limiter 10 is disposed in one of a pair of supply leads 12 with an auxiliary set of shunting or shorting contact means such as contacts 14, 16 provided in a short circuit 18 which is parallel to a load 20. As shown in FIG. 1, a short circuit 18 is disposed between the current limiter and the load 20. When the current limiter 10 starts operating, the contacts 14 and 16 close immediately in a manner to be described hereinbelow to provide a very low impedance path for the current in parallel with the load 20 so that the current falls off very rapidly through the load once the auxiliary contacts have been closed. It is noted that although single contacts 14, 16 are disclosed, multiple parallel contacts may be and are preferably employed for each contacts 14 and 16 in order to improve performance by reducing impedance. In FIG. 2 a circuit breaker 22 is used in series with the current limiter 10 and is disposed between the short circuit 18 and the load 20 and is protected to a lower level of peak let-through current.

Figure 3:
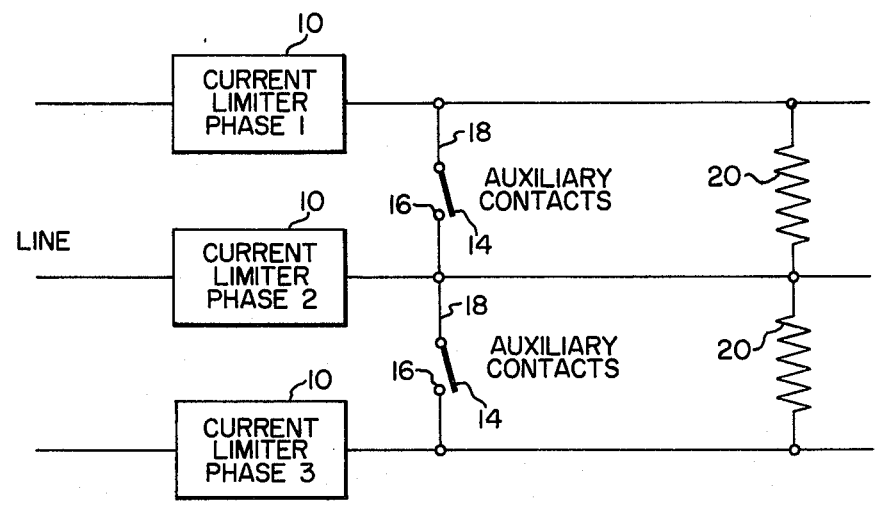
FIG. 3 is a schematic view showing current limiters in a three-phase system.

The three-phase system of FIG. 3 includes similar current limiters 10 and short circuits 18 with auxiliary contacts 14 and 16 between the current limiter and the load 20. The arrangement enables the use of only a single contact arm to short out all three phases.

Figure 4:
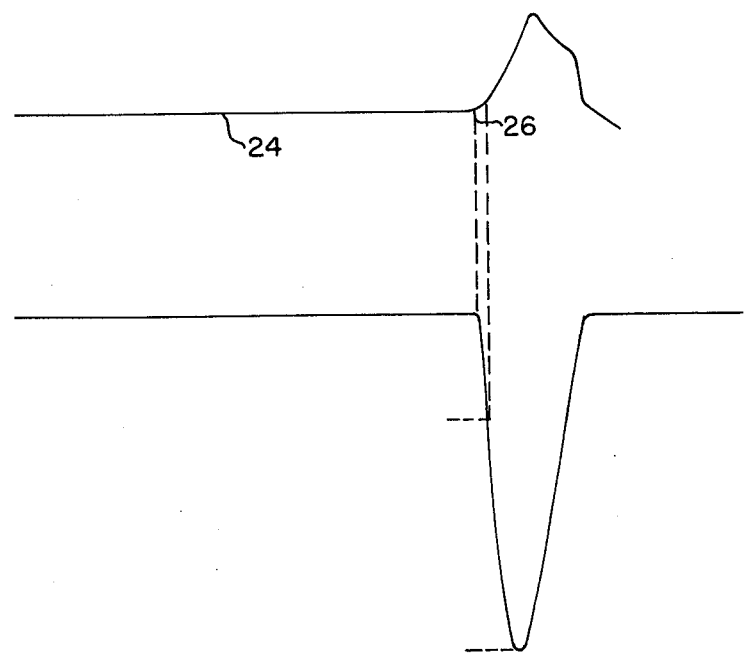
FIG. 4 is a typical oscillogram obtained with a 400 ampere current limiter.

In FIG. 4 the curves of a typical oscillogram are shown as obtained with a 400 ampere current limiter. Assuming that the arc voltage 24 is linear with travel it is noted that a 0.050 inch displacement 26 is obtained at 0.35 millisecond when the current is approximately 14KA. If the auxiliary contacts 14, 16, being preferably 0.30 inch apart, are closed at this point, the peak let-through current in the load can be limited to less than 15KA.

Figure 5:
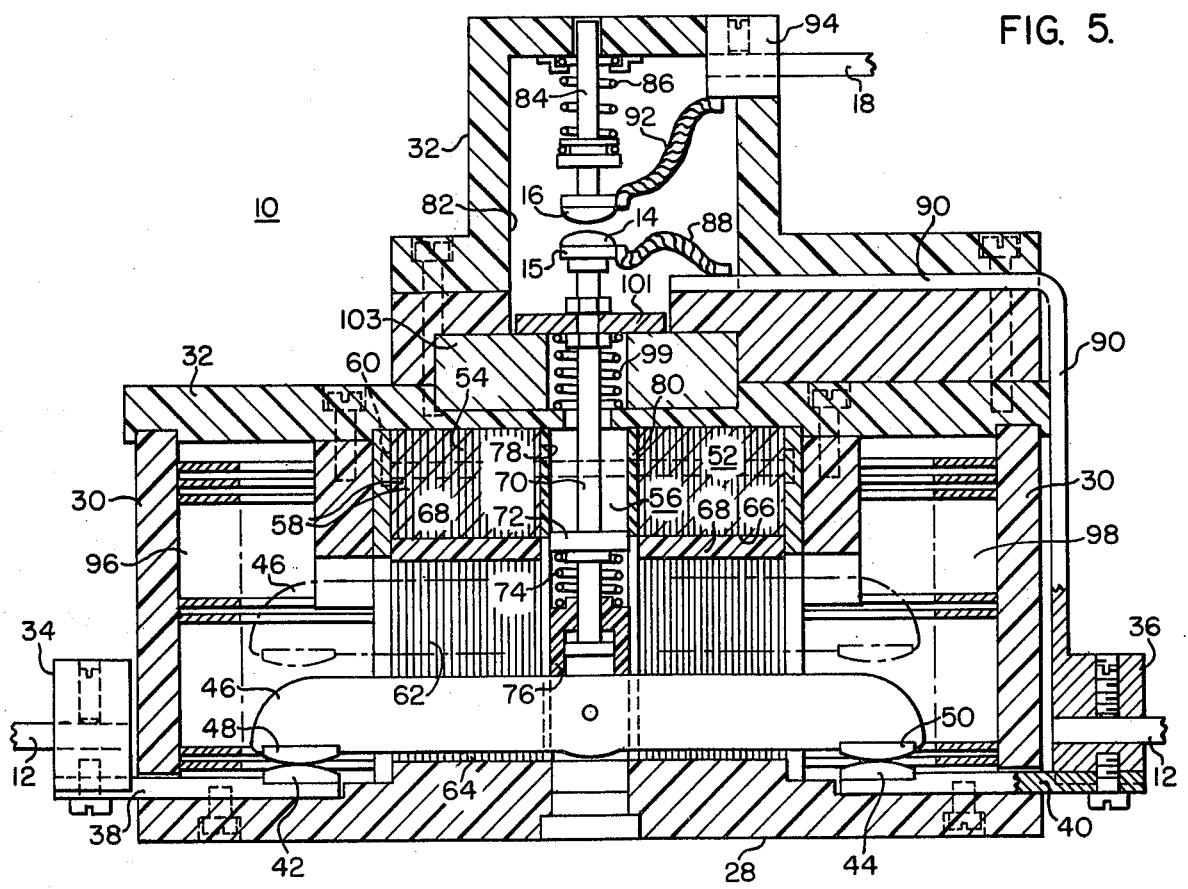
FIG. 5 is a vertical sectional view of a current limiter having auxiliary contacts.

One embodiment of the current limiter 10 is shown in FIG. 5 and it comprises an insulating housing including a base 28, end walls 30, and a cover 32. A line terminal 34 and a load terminal 36 are connected to similar conductors 38 and 40, respectively. Stationary contacts 42 and 44 are mounted on the ends of the respective conductors 38 and 40 opposite the corresponding terminals. A contact arm or carrier 46 comprises movable contacts 48 and 50 and extends between the stationary contacts 42 and 44 with which the movable contacts cooperate. Accordingly, a circuit through the current limiter 10 enters from the line 12 and passes through the terminal 34, the conductor 38, the contacts 42 and 48, the contact arm 46, the contacts 50, 44, the conductor 40, the terminal 36, and exits through the line 12 at the right end of the current limiter 10.

A circuit interrupter structure 52 is disposed substantially centrally of the housing and comprising a magnetic drive structure including a magnetic slot motor 54, the contact arm 46, and a support 56 for the contact arm 46. The magnetic slot motor 54 is a rectangular body comprises of a plurality of laminations of relatively thin plates 58 of soft magnetic material, such as cold rolled steel, that are secured together in a surface-to-surface relationship. The body of plates 58 is retained together by a plurality of spaced means such as bolts 60. The magnetic slot motor 54 is a magnetic yoke formed of the inverted U-shaped plates 58 to provide a slot 62, the lower end of which is open at 64 and the upper end of which is closed at 66. Pads 68 composed of resilient materials, such as nylon, are mounted on the upper surfaces 66 to serve as bumpers for the contact arm 46 when it moves from the closed-contact-position to the open circuit position as shown by the broken line position in FIG. 5.

The support means 56 comprise a shaft 70, a spring retainer 72, a compression spring 74, and a guide 76. The support means 56 is disposed within a central opening 78 which is substantially centrally disposed of the body of the slot motor 54, that is, the lower end of the opening 78 communicates with the slot 62. A liner 80 of non-conducting materials such as Teflon, is coextensive with the vertical length of the opening and extends from the lower open end 64 of the slot 62 to the top side of the magnetic slot motor 54. The lower end portion of the liner 80 has a pair of diametrically opposite slots aligned with the slot 62 of the slot motor 54 in order to accommodate reciprocating movement of the contact bridging arm 46.

The shaft 70 is attached at the lower end to the contact arm 46 and extends axially of the opening 78 to a chamber 82 formed by wall portions of the cover 32. One of the auxiliary contacts 14 is mounted on an insulating attachment 15 to the upper end of the shaft 70 and the other end of the shaft 70 and the other end of the auxiliary contacts 16 is mounted on a slidable shaft 84 disposed above the contact 14. A contact-compression spring 86 encircles the shaft 84 to retain the contact 16 in proximity with the contact 14. The preferred spacing between the contacts 14,16 in the normally open position, as shown in FIG. 5, is approximately 0.030 inch. A flexible conductor 88 extends from the contact 14 to a conductor 90 which strap conductor is in electrical contact with the load terminal 36. Likewise, a flexible conductor 92 extends from the auxiliary contact 16 to a terminal 94, which terminal is connected to the short circuit 18 (FIGS. 1 and 2). The spring 74 is a compression spring which extends between the spring retainer 72 and the guide 76, thereby holding the briding contact arm 46 tautly in the closed circuit position.

During the period of normal current condition the current passing through the contact arm 46 creates an encircling magnetic field within the magnetic slot motor 54. The force generated on the contact arm 46 due to the encircling magnetic field during normal current conditions is such that the arm 46 remains in the closed circuit position. Upon the occurrence of a severe overload above a predetermined value, the increased electromagnetic force in the magnetic slot motor 54 moves the contact arm 46 upwardly within the slot 62, and thereby opens the electrical circuit through the stationary contacts 42, 44. To aid in the development of arc voltage and to absorb some of the energy of arcing created between the contacts 42, 48 and 44, 50 conventional arc shoes or spaced-plate arc chambers 96, 98 are provided.

So long as the overload current condition prevails the briding contact arm 46 remains in the uppermost (broken line) open-circuit position. When however an overload is eliminated, the contact arm 46 is held in the open-circuit position by suitable means such as a compression spring 99. The arm 46 may be reclosed either automatically or manually by suitable means such as depressing the keeper 101 on a magnetic latch coil 103 until the bridgin contact arm 46 engages the stationary contacts 42, 44.

Inasmuch as the spacing between the auxiliary contacts 14 and 16 is small, approximately 0.030 inch, the contacts are closed when the contact arm 46 raises only slightly from its closed circuit position (FIG. 5). Continued movement of the bridging contact arm 46 to the uppermost position at the top of the slot 62 causes the contacts 14, 16 to remain in closed-circuit condition with the contact 16 pressing upwardly against the contact compression spring 86.

Figure 6:
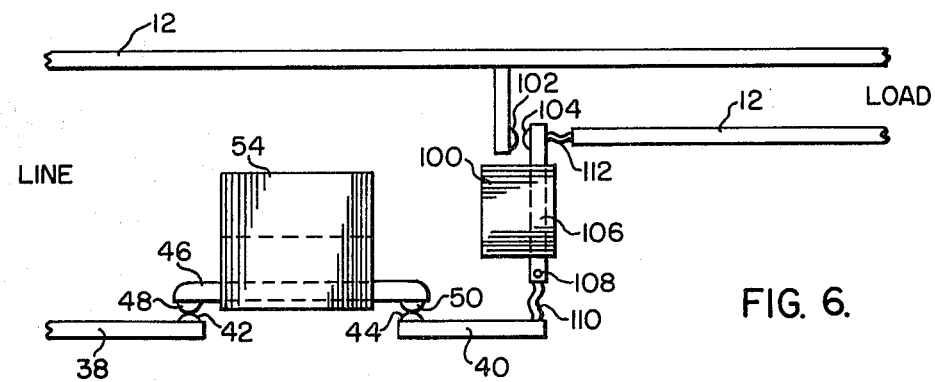
FIG. 6 is a diagrammatic view showing the use of two magnetic slot motors in conjunction with a contact arm; and, FIGS. 7 and 8 are other embodiments of the invention.

Another embodiment of the invention is shown in FIG. 6 in which parts corresponding to those shown in FIG. 5 have corresponding reference numbers. In this embodiment a second magnetic slot motor 100 is provided to operate a pair of auxiliary contacts 102 and 104. A contact arm 106 is pivotally mounted at 108 and connected to a flexible conductor 110. A movable contact 104 is mounted on the upper end of the pivotally mounted arm 106. In addition, a flexible conductor 112 connects the upper end of the contact arm 106 to the lead 12.

In operation under normal current conditions the current path through the embodiment shown in FIG. 6 is through the contacts 42, 48, the bridging contact arm 46, the contacts 50, 44, the conductors 40, 110, the contact arm 106 and the flexible conductor 112 to the load lead 12. Upon the occurrence of a severe overload above a predetermined value, the magnetic forces generated in the magnetic slot motors 54 and 100 move their corresponding contact arms 46 and 106, respectively, in a manner similar to that described above with respect to the embodiment of FIG. 5, thereby opening the circuit through the contacts 42, 48 and 50, 44 and closing the circuit through the auxiliary contacts 102, 104. Here again the preferred spacing between the auxiliary contacts 102, 104 is approximately 0.030 inch, whereby the shorting circuit 18 comes into play almost immediately after the contacts 42, 48 and 44, 50 are open.

Figure 7:
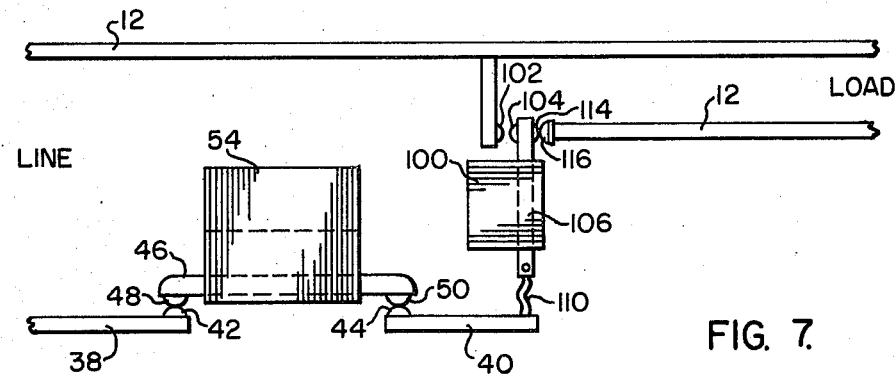

Another embodiment of the invention is that shown in FIG. 7 and differs only in the substitution of secondary auxiliary contacts 114 and 116 for the flexible conductor 112 of FIG. 6. Whereas the contacts 102, 104 in the embodiment of FIG. 6 move about 0.030 to 0.050 inch to close and thereby place a short circuit in parallel with the load the main advantage of that embodiment is that the auxiliary contacts 102 and 104 are held together with considerable force until the current is reduced. In the embodiment of FIG. 7 the contact arm 106 functions like a switch in which it first breaks contact with the load at contacts 114, 116 and then makes the short circuit connection 18 between the contacts 102 and 104 in which the current limiter 10 is only then connected in series. The short circuiting continues so long as arcs between the contacts 42, 48 and 44, 50 exist.

Figure 8:
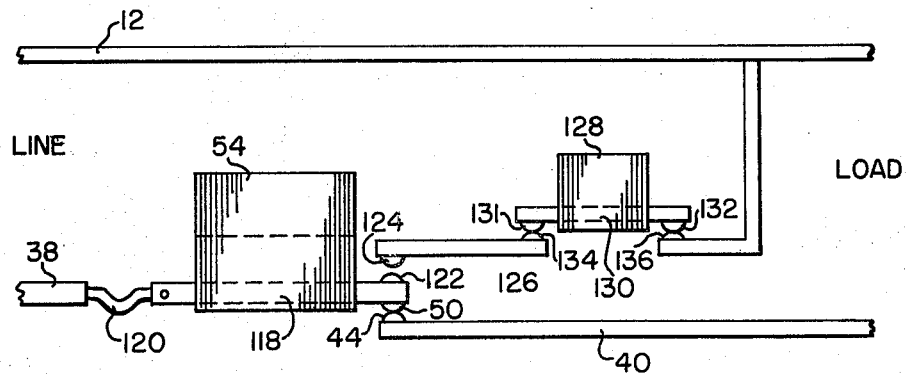

Another embodiment of the invention is that disclosed in FIG. 8 in which a single-break contact arm 118 is mounted in the magnetic slot motor 54. A flexible conductor 120 extends between the conductor 38 and the left end of the arm 118. In addition to the movable contact 50 at the right end of the arm 118 a second contact 122 is provided to function in cooperation with a stationary contact 124 on a stationary conductor 126. A magnetic slot motor 128 having a bridging contact arm 130 serves as the current limiter, and the arm 130 may be a double or single break contact arm. In this embodiment the contact arm 130 is a double break contact arm provided with movable contacts 131 and 132 at opposite ends thereof which cooperate with stationary contacts 134 and 136, respectively. In this embodiment of the invention the contact arm 118 is used to disconnect a load and to connect a short circuit path 18 in which the current limiter 128 is located. A slight delay in the operation of the current limiter 128 can be arranged so that it does not operate until the arc to the load contact 44 has extinguished. The purpose of this embodiment of the invention is to reduce the size of the current limiter 128 because it does not carry a full load current during normal load-carrying operation. For example, the contact arm 118 in a 1200 ampere application would have to be large enough to carry 1200 amperes continuously, whereas the contact arm 130 in the current limiter 128 carries only the transient current surge during abnormal operation and can consequently have a much smaller cross sectional area and mass.

The auxiliary contacts 14 and 16 shown in FIG. 1 and 2 can be closed by any high speed closing mechanism and may operate for a given rate of rise of current and peak current value if necessary, the purpose being to avoid making a short circuit fault out of a smaller fault. However, if the device operates only for a higher fault where an associated downstream circuit breaker or equipment has an inadequate withstand and provides a suitable number of operations it should be satisfactory because a fuse would have blown and require replacement.

Accordingly, the circuit interrupter of this invention provides a two-level current limiting device with current limiting being provided on the main or supply side to one level or peak let through current and on the load side to a much lower level. This is achieved by activating a short circuit in parallel with the load. The short circuit in turn is obtained by closing a set of auxiliary contacts the instant the current limiter begins to operate. The current limiter remains in the supply circuit to continue operating the circuit and dissipate the energy in an arc extinguishing structure.

What is claimed is:

1. A circuit interrupter protective device for responding to higher abnormal currents on the supply side than on the load side of an electrical distribution system, comprising a housing, a circuit interrupter structure in said housing and comprising first stationary contact means, first movable contact means cooperable with said stationary contact means, a contact carrier carrying said movable contact means, support means supporting said movable contact carrier for movement between closed and open positions, a magnetic drive structure comprising a magnetic device of magnetic material having an open slot therein open at one end thereof and closed at the other end thereof, said contact carrier being positioned in said slot in proximity to the open end of said slot, said support means including movable means for moving said contact carrier to the closed position, the circuit through said circuit interrupter passing through said contact carrier and said contacts in the closed position of said contact carrier, a second pair of contacts cooperating with the contact carrier and in a shorting circuit parallel with the load side of the system, and the second pair of contacts being movable between open and closed positions substantially simultaneously with the first and second pairs of contacts, and upon the occurrence of an overload current above a predetermined value through the contact carrier the magnetic flux generated by the current in the contact carrier operating in the magnetic device to drive the contact carrier into the slot toward the closed end of the slot to thereby open the first contacts and causing the second contacts to close.

2. The circuit interrupter protective device of claim 1 in which the shorting circuit is located between the first contacts and the load side.

3. The circuit interrupter protective device of claim 2 in which the support means carrying the second movable contact comprises an insulated member on one end of which the second movable contact is mounted and the other end of which is mounted on the contact carrier.

4. The circuit interrupter protective device of claim 3 in which the spacing between the first movable and stationary contacts in the normally open position is less than the distance of travel of the contact carrier carrying the first movable contact.

5. The circuit interrupter protective device of claim 2 in which the support means carrying the second movable contact comprises a second magnetic drive structure comprising a magnetic device of magnetic material having a second open slot therein open at one end thereof and closed at the other end thereof, the second magnetic drive structure also comprises an electrically conductive arm positioned in the second slot in proximity to the open end, and the electrically conductive arm being movable to the other end of the second open slot upon opening of the circuit through the first and second contact means.

6. The circuit interrupter protective device of claim 5 in which one of the electrically conductive arm and the the contact carrier is pivotally movable.

7. The circuit interrupter protective device of claim 6 in which the other of the electrically conductive arm and the contact carrier is movable transversely of its axis.

8. The circuit interrupting protective device of claim 5 in which the first and second contact means comprise a pair of spaced contacts.

9. A circuit interrupter protective device for responding to higher abnormal currents on the supply side than on the load side of an electrical distribution system, comprising a first stationary contact, a first movable contact cooperable with the first stationary contact, a contact carrier carrying the first movable contact between open and closed positions, a second stationary contact, a second movable contact cooperable with the second stationary contact and in the normally open position, the first contacts being in series with the load side, the second contacts being in a shorting circuit parallel with the load side, a first magnetic drive structure comprising a magnetic device of magnetic material having an open slot therein open at one end thereof and closed at the other end thereof, support means carrying the second movable contact between open and closed positions, the circuit through the circuit interrupter passing through the contact carrier and the first contacts in the closed positions of the contact carrier, and upon the occurrence of an overload current above a predetermined value through the contact carrier the magnetic flux generated by the current carrier operating in the magnetic device to drive the contact carrier into the slot toward the closed end of the slot to thereby open the first contacts and causing the second contacts to close.

10. The circuit interrupter protective device of claim 9 in which the shorting circuit provides a low impedance path for the current in parallel with the load and upon the occurrence of an overload current in the circuit in series with the load.

* * * * *